United States Patent [19]
Ostertag et al.

[11] Patent Number: 5,573,584
[45] Date of Patent: Nov. 12, 1996

[54] INTERFERENCE PIGMENTS FOR PREPARING FORGERYPROOF DOCUMENTS

[75] Inventors: Werner Ostertag, Gruenstadt; Helmut Schmidt, Osthofen, both of Germany

[73] Assignee: BASF Aktiengesellschaft, Ludwigshafen, Germany

[21] Appl. No.: 325,178

[22] PCT Filed: Nov. 30, 1993

[86] PCT No.: PCT/EP93/03351

§ 371 Date: Apr. 21, 1995

§ 102(e) Date: Apr. 21, 1995

[87] PCT Pub. No.: WO94/13489

PCT Pub. Date: Jun. 23, 1994

[30] Foreign Application Priority Data

Dec. 11, 1992 [DE] Germany .................. 42 41 753.8

[51] Int. Cl.$^6$ .................................................. C04B 14/20
[52] U.S. Cl. ...................... 106/417; 106/415; 101/491
[58] Field of Search .................................. 106/417, 415

[56] References Cited

U.S. PATENT DOCUMENTS

| 3,087,827 | 4/1963 | Klenke et al. | 106/417 |
|---|---|---|---|
| 3,087,828 | 4/1963 | Linton | 106/417 |
| 4,076,551 | 2/1978 | Bernhard et al. | 106/417 |
| 4,344,987 | 8/1982 | Ostertag et al. | 427/213 |
| 4,434,010 | 2/1984 | Ash | 106/415 |
| 4,552,593 | 11/1985 | Ostertag et al. | 106/417 |
| 4,867,793 | 9/1989 | Franz et al. | 106/415 |
| 4,954,176 | 9/1990 | Minohara et al. | 106/417 |
| 5,059,245 | 10/1991 | Philips et al. | 106/22 C |
| 5,223,360 | 6/1993 | Prengel et al. | 427/500 |

FOREIGN PATENT DOCUMENTS

| 045 851 | 7/1981 | European Pat. Off. . |
| 14 67 468 | 6/1962 | Germany . |
| 32 37 264 | 10/1982 | Germany . |
| 36 17 430 | 5/1986 | Germany . |
| 41 41 069 | 12/1991 | Germany . |

*Primary Examiner*—Mark L. Bell
*Assistant Examiner*—Scott L. Hertzog
*Attorney, Agent, or Firm*—Oblon, Spivak, McClelland, Maier & Neustadt, P.C.

[57] ABSTRACT

Interference pigments based on multiply coated plateletlike silicatic substrates comprising A) a first layer comprising a colorless or selectively absorbing metal oxide with a high refractive index, B) a second, non-selectively absorbing, semitransparent layer consisting essentially of carbon, a metal or a metal oxide, and optionally C) a third layer comprising a colorless or selectively absorbing metal oxide in combination with scattering color pigments which are complementary in color to the reflection color of the interference pigments are useful for preparing valuable documents that are forgeryproof.

5 Claims, No Drawings

INTERFERENCE PIGMENTS FOR PREPARING FORGERYPROOF DOCUMENTS

The present invention relates to the use of specific interference pigments combined with scattering color pigments which are complementary in color to the reflection color of the interference pigments, for preparing valuable documents that are forgeryproof, in particular difficult or impossible to photocopy.

The forgeryproofing of valuable documents such as paper money, postage stamps, checks, tax stamps, check cards, rail or air tickets, credit cards, telephone cards, lottery tickets, share certificates, gift tokens, passes or identity cards is becoming more and more important in view of the introduction of evermore powerful color copiers and the attendant scope for forgery.

Forgeryproofness has in the past been pursued in various ways. For instance, the originals were marked using magnetic pigments or fluorescent dyes. However, these markings have the disadvantage that their presence is not immediately recognizable visually; they can only be detected using appropriate, more or less complex reading apparatus. The same is true of marking with IR or UV dyes or pigments.

Greater interest therefore pertains to marks which are sufficiently reliably identifiable with the unaided, naked eye and make it easy to distinguish the original from the copy. In practice this kind of mark took the form of water marks—silvery bright metal strips which show up black in the copy owing to the total reflection of the light—or holograms. However, the disadvantage of these marks is that they are easy to imitate or, in the case of holograms, costly and prone to damage. The most recent addition to the ways of marking authenticity is the use of simple interference pigments. However, applied atop a light-colored background, interference pigments are virtually invisible and the marking is consequently easily overlooked.

Interference pigments in the conventional sense (described for example in US-A-3 087 827) are platelet-like luster pigments consisting predominantly of a mica substrate coated with a layer of highly refractive material, eg. rutile, zirconium dioxide or tin dioxide, in a certain thickness (in general >50 nm) to form thin platelet colors. Interference pigments have to be applied in an oriented state. However, the intensity of the color of interference color pigments is low compared with that of scattering color pigments. They have an angle-dependent reflection maximum. Interference pigments of this type have for many years been used in cosmetics and plastics.

US-A-3 087 827 describes interference pigments coated with a highly absorbing carbon layer, but these pigments have never been used for documents.

EP-A-353 544 describes interference pigments which have a metal coating as being suitable for security printing; however, these pigments are not used in combination with specific color pigments.

There have also been disclosed multi-layer pigments which exhibit a distinct angle-dependent color change and are prepared by pulverizing thin film security devices—thin multi-layer films detached from the substrate; cf. US-A-4 434 010, US-A-5 059 245. The optical principle of such pigments is that of the transmission filter. The sequence of layers making up such pigments typically includes a dielectric layer of low refractive index, eg. silicon dioxide, a semitransparent reflecting metal layer, eg. titanium, aluminum or chromium, a dielectric layer of low refractive index, eg. silicon dioxide, a highly reflecting opaque metal layer, eg. aluminum or titanium, a dielectric layer of low refractive index, eg. silicon dioxide, a semitransparent reflecting metal layer, eg. aluminum, chromium or titanium, and a dielectric layer of low refractive index, eg. silicon dioxide.

Pigments of this type have the disadvantage that they are costly and not stable to alkali and, what is more, usually do not have the desired acid fastness.

It is an object of the present invention to provide suitable pigments or pigment combinations for the forgeryproof marking of valuable documents, so that in particular photocopying these documents with powerful copiers is made more difficult or, by virtue of hue falsification, impossible.

We have found that this object is achieved by the use of interference pigments based on multiply coated plateletlike silicatic substrates comprising A) a first layer comprising a colorless or selectively absorbing metal oxide with a high refractive index, B) a second, non-selectively absorbing, semitransparent layer consisting essentially of carbon, a metal or a metal oxide, and optionally C) a third layer comprising a colorless or selectively absorbing metal oxide in combination with scattering color pigments which are complementary in color to the reflection color of the interference pigments, for preparing forgeryproof documents, in particular valuable documents that are difficult or impossible to copy.

The contemplated interference pigments are products known per se. They are described for example with methods of preparation in US-A-3 087 827, US-A-3 087 828 and the earlier German Patent Application P 41 41 069.

Suitable plateletlike silicatic substrates are in particular light-colored or white micas, particularly preferably flakes of, preferably wet ground, muscovite. It is of course also possible to use other natural micas, such as phlogopite or biotite, artificial micas or talc or glass flakes.

These substrates have already been coated with a first layer comprising a colorless or selectively absorbing (i.e. non-black) metal oxide of high refractive index, for example titanium oxide, zirconium oxide, tin oxide, chromium oxide, iron oxide, aluminum oxide, silicon oxide, zinc oxide, bismuth oxychloride or mixtures thereof. Preference is given to coatings with iron(III) oxide or zirconiumoxide and particularly preferably with titanium dioxide, These singly coated pigments are common knowledge; cf. for example DE-C-1 467 468, EP-A-45 851, DE-A-3 237 264 or DE-A-3 617 430. Metal oxide-coated mica platelets are also commercially available under the names Iriodin (E. Merck, Darmstadt), Flonac® (Kemira Oy, Pori, Finland) or Mearlin® (Mearl Corporation, Ossining, N.Y.).

The second, non-selectively absorbing, transparent layer may be composed of carbon, metals, for example those which can be applied by gas phase decomposition of volatile compounds, such as iron, cobalt, nickel, chromium, molybdenum or tungsten, or black metal oxides, such as iron oxide, magnetite, nickel oxide, cobalt oxides (CoO, $Co_3O_4$), vanadium oxides ($VO_2$, $V_2$, $V_2O_3$) or mixtures thereof, in particular iron and magnetite. The use of interference pigments coated essentially with carbon is preferred.

The interference pigments used may additionally have a third layer comprising a colorless or selectively absorbing metal oxide. Suitable metal oxides for this layer are for example titanium oxide, zirconium oxide, tin oxide, chromium oxide, iron oxide, aluminum oxide, silicon oxide, zinc oxide or mixtures thereof. Particular preference is given to iron(III) oxide, titanium dioxide, zirconiumdioxide or mixtures thereof. The third layer of oxide is advantageously adapted in the individual case to the second, black layer.

Preference is given to using interference pigments having 2 layers.

Preference is further given to using interference pigments which, based on the weight of the luster pigment, contain from 0.03 to 5% by weight, preferably from 0.1 to 0.6% by weight, of a second non-selectively absorbing layer. This corresponds to a thickness for the second layer of from 1 to 30 nm.

Preference is further given to using interference pigments having an average particle size (based on the largest particle diameter) of from 5 to 30 μm.

Scattering color pigments for the purposes of the present invention are pigmentary colorants which work chiefly by selective absorption or diffuse scattering. As scattering color pigments it is also possible to use scattering white pigments surface-colored with transparent colorants.

Suitable scattering color pigments include not only inorganic but also organic pigments having a refractive index n greater than 1.65.

Examples of inorganic pigments are iron oxides, bismuth vanadate, colored spinels and nickel titanium yellow.

Examples of organic pigments are those of the class of the monoazo pigments (eg. products derived from acetoacetarylide derivatives or from β-naphthol derivatives), laked monoazo dyes, such as laked β-hydroxynaphthoic dyes, disazo pigments, fused disazo pigments, isoindoline derivatives, derivatives of naphthalene- or perylene-tetracarboxylic acid, anthraquinone pigments, thioindigo derivatives, azomethine derivatives, quinacridones, dioxazines, pyrazoloquinazolones, phthalocyanine pigments or laked basic dyes, such as laked triarylmethane dyes, provided they have a refractive index n greater than 1.65. Otherwise these pigments are suitable for the surface coloring of scattering white pigments.

A suitable scattering white pigment for surface coloring is in particular titanium dioxide.

The use of the interference pigments according to the invention has two advantages for visual perception. First, the pigmented marking is easy to see from every angle, even against a transparent or light-colored ground. Secondly, the coating has the effect that the reflected interference color can be seen significantly more clearly and with a much higher intensity. Furthermore, coating valuable documents with the interference pigments to be used according to the invention has the effect that copying, even with powerful color copiers, gives rise to off-shade colors which, combined with the color pigments according to the invention become invisible.

On copying for example a document marked with a violet interference pigment (structure: mica substrate/115 nm of rutile/20 nm of carbon) and a scattering white pigment (rutile), the interference pigment with the violet reflection color will appear yellow against the white scattering background. If the background is pigmented with iron red, cobalt spinel blue or halogenated phthalocyanine instead of titanium dioxide, the color copy will show brownish, greenish or yellow-green off-shade colors. The same result is obtained on coloring the scattering white pigment with dyes, for example paper dyes, in red, blue or yellow.

The combination according to the invention of the interference pigments with the scattering color pigments which are complementary in color to the reflection color of the interference pigments is particularly advantageous on applying the interference pigments atop a background of color pigment. If, for example, an interference pigment having a bluish violet reflection color is applied atop a background colored with a pigment that scatters yellow light, the color copy will show virtually nothing other than yellow; that is, the bluish violet interference pigment will be virtually invisible.

To obtain the above-described effects, the black absorbing layer of the interference pigments must not be too thick. It must be semitransparent to incident light. Pigments in thick layers which totally absorb incident light show up black in color copies. When a pigment having a red, blue or green reflection color shows up as black in the copy, that also counts as an off-shade color.

Forgeryproof documents are preferably prepared using interference pigments having a violet or blue reflection color. They are used in combination with scattering color pigments having a yellow or greenish yellow hue.

The above-described colorants are applied via the preparation of a printing ink and subsequent printing using conventional printing methods, eg. screen printing, intaglio printing, bronzing, flexographic printing or offset printing.

Although the preparation of copyproof documents with interference pigments and scattering color pigments is always best with the interference pigments ending up at the very top, i.e. printed atop a printed ground of scattering color pigment, the desired effect of hue falsification is still noticeable—albeit not as powerfully—when the interference pigment and the scattering color pigment are mixed.

The Examples which follow illustrate the invention.

EXAMPLE 1

100 g of the commercial mica pigment Iriodin 9225 rutile pearl blue (E. Merck, Darmstadt; average particle size 19 μm, specific surface area 3 $m^2$/g muscovite, rutile coating) were introduced with stirring into a solution of 4 g of sorbitol in 100 ml of water. The pasty mass was dried at 160° C. in a drying cabinet for 10 h, then coarsely comminuted and heated over 70 min to 460° C. under nitrogen in a rotating sphere oven. The product was then maintained at that temperature for 3 h and thereafter cooled down under nitrogen.

The pigment obtained has a deep blue color and a carbon content of 0.5% by weight. Electron micrographs show that the mica particles have a uniform coating of carbon. From the carbon content it is possible to calculate a layer thickness of 2.5 nm.

The pigment was then applied by bronzing to a yellow sheet of paper printed uniformly with a printing ink comprising a bismuth vanadate pigment. For this the yellow paper coated with bismuth vanadate pigment was printed with a commercial non-pigmented offset binder (composition: maleate resin/linseed oil/mineral oil) and then dusted with the above-prepared blue luster pigment. The pigment adheres in the binder-printed areas, whereas it is readily removed from the unprinted areas using a velvet roll.

The print prepared with the luster pigment has a shiny blue color. A copy made with a Canon CLC 500 color copier shows nothing but yellow. The areas of the paper printed with the luster pigment are virtually invisible in the copy.

EXAMPLE 2

Example 1 was repeated to coat 100 g of the commercial mica pigment Iriodin 9219 rutile pearl purple WR with carbon, which produced a deeply purple-colored pigment, and applied by the bronzing technique to yellow paper printed with bismuth vanadate.

The print prepared with the luster pigment has a shiny purple color. A copy made with a color copier (Canon CLC 500) shows nothing but yellow. The areas printed with the luster pigment are virtually invisible in the copy.

EXAMPLE 3

100 g of the commercial mica pigment Iriodin 231 rutile fine green were introduced with stirring into a solution of 8 g of sorbitol in 100 ml of water. The mixture was dried in a drying cabinet at 155° C., then deagglomerated with a spatula, heated in a rotating sphere oven under nitrogen at 450° C. for 18 min, and cooled down under nitrogen to room temperature over 4 h.

The pigment obtained has a deep green reflection color. It has a carbon content of 0.8% by weight. The coating of carbon is visible under the electron microscope.

The pigment was stirred into a commercial alcoholic binder solution to form an intaglio printing ink containing 52% by weight of nitrocellulose/ethanol/dioctyl phthalate and 55% by weight of pigment.

This ink was then printed (54 lines per cm 120°, well depth 40–45 μm) onto red coated paper coated with $Fe_2O_3$-containing offset ink.

What is claimed is:

1. A process for preparing forgeryproof documents comprising printing said documents with interference pigments based on multiply coated platelet-shaped silicatic substrates comprising:
    A) a first layer comprising a colorless or selectively absorbing metal oxide with a high refractive index,
    B) a second, non-selectively absorbing, semitransparent layer consisting essentially of carbon, a metal or a metal oxide, and optionally
    C) a third layer comprising a colorless or selectively absorbing metal oxide in combination with scattering color pigments which are complementary in color to the reflection color of the interference pigments.

2. The process as claimed in claim 1, wherein the layer (B) consists essentially of carbon.

3. The process as claimed in claim 1, wherein the layer (B) is from 1 to 30 nm in thickness.

4. The process as claimed in claim 1, wherein the interference pigment has 2 layers.

5. A forgeryproof document printed by the process of claim 1.

* * * * *